US 9,684,619 B2

(12) United States Patent
Yoon et al.

(10) Patent No.: US 9,684,619 B2
(45) Date of Patent: Jun. 20, 2017

(54) I2C ROUTER SYSTEM

(71) Applicant: Samsung Display Co., LTD., Yongin, Gyeonggi-Do (KR)

(72) Inventors: Ki-Tae Yoon, Seoul (KR); Young-Soo Sohn, Guri-si (KR); Jae-Gwan Jeon, Incheon (KR); Akihiro Takegama, Hwaseong-si (KR)

(73) Assignee: Samsung Display Co., LTD. (KR)

( * ) Notice: Subject to any disclaimer, the term of this patent is extended or adjusted under 35 U.S.C. 154(b) by 367 days.

(21) Appl. No.: 14/452,437

(22) Filed: Aug. 5, 2014

(65) Prior Publication Data

US 2015/0161075 A1    Jun. 11, 2015

(30) Foreign Application Priority Data

Dec. 9, 2013  (KR) .................. 10-2013-0152158

(51) Int. Cl.
   *G06F 13/40*     (2006.01)
   *G06F 13/42*     (2006.01)

(52) U.S. Cl.
   CPC ...... *G06F 13/4022* (2013.01); *G06F 13/4027* (2013.01); *G06F 13/4291* (2013.01)

(58) Field of Classification Search
   CPC .. G06F 13/40; G06F 13/4004; G06F 13/4022; G06F 13/4027; G06F 13/4045; G06F 13/4282; G06F 13/4291
   See application file for complete search history.

(56) References Cited

U.S. PATENT DOCUMENTS

| 6,233,635 | B1 * | 5/2001 | Son | G06F 13/4291 710/315 |
| 6,301,623 | B1 * | 10/2001 | Simpson | H04L 41/0893 370/489 |
| 6,339,806 | B1 * | 1/2002 | Foster, Sr. | G06F 13/4022 710/110 |
| 6,526,464 | B1 * | 2/2003 | Jobs | G06F 13/4295 710/300 |
| 6,745,270 | B1 * | 6/2004 | Barenys | G06F 13/4291 710/104 |

(Continued)

FOREIGN PATENT DOCUMENTS

| JP | 2003-242048 A | 8/2003 |
| KR | 10-2005-0011822 A | 1/2005 |

(Continued)

OTHER PUBLICATIONS

"PCA9548 8-channel I2C switch with reset". Feb. 19, 2002. Philips Semiconductors.*

(Continued)

*Primary Examiner* — Thomas J Cleary
(74) *Attorney, Agent, or Firm* — Innovation Counsel LLP

(57) ABSTRACT

An I2C router system includes an I2C router part, a first slave device and a second slave device. The I2C router part includes a first I2C router configured to output a first I2C signal via a first I2C bus, and a second I2C router configured to output a second I2C signal via a second I2C bus. The first slave device can be configured to receive the first I2C signal via the first I2C bus. The second slave device can be configured to receive the second I2C signal via the second I2C bus.

18 Claims, 5 Drawing Sheets

(56) References Cited

U.S. PATENT DOCUMENTS

| | | | | |
|---|---|---|---|---|
| 6,981,087 B1* | 12/2005 | Heitkamp | ............ | G06F 13/368 710/119 |
| 8,185,680 B2* | 5/2012 | Drexler | ................ | G06F 13/368 710/119 |
| 8,543,740 B2* | 9/2013 | Lotzenburger | .... | H04L 12/40006 710/10 |
| 2003/0212847 A1* | 11/2003 | Bandholz | ............ | G06F 13/4291 710/305 |
| 2004/0049651 A1* | 3/2004 | Ervin | .................... | G06F 12/063 711/206 |
| 2004/0268138 A1 | 12/2004 | Larson et al. | | |
| 2005/0120155 A1 | 6/2005 | Chao | | |
| 2007/0162671 A1* | 7/2007 | Seo | .................... | G06F 13/4282 710/110 |
| 2009/0234999 A1* | 9/2009 | Huang | ................ | G06F 13/4291 710/110 |
| 2011/0113179 A1* | 5/2011 | Cartes | ................ | G06F 13/4022 710/316 |
| 2012/0066423 A1* | 3/2012 | Choo | ................. | G06F 13/4291 710/110 |
| 2012/0191889 A1* | 7/2012 | Fischer | ............... | G06F 13/4291 710/110 |
| 2014/0025851 A1* | 1/2014 | Decesaris | ............ | G06F 13/385 710/110 |
| 2014/0149615 A1* | 5/2014 | Fosse | .................. | G06F 13/4291 710/110 |

FOREIGN PATENT DOCUMENTS

| | | |
|---|---|---|
| KR | 10-0668976 A | 1/2007 |
| KR | 10-0848545 B1 | 7/2008 |
| KR | 10-1222108 A | 1/2013 |

OTHER PUBLICATIONS

"Tiny Analog Switch Alleviates I²C Address Conflicts". Application Note 1072. Jul. 22, 1998. Maxim Integrated Products.*

Venugopal, Rajesh. " 2-Channel and 4-Channel Pin-Selectable I2C Multiplexer Features High Noise Margin, Capacitance Buffering, Level Translation and Stuck Bus Recovery". Oct. 2011. LT Journal of Analog Innovation. pp. 11-15.*

\* cited by examiner

I2C ROUTER SYSTEM

This application claims priority to Korean Patent Application No. 10-2013-0152158, filed on Dec. 9, 2013, and all the benefits accruing therefrom under 35 U.S.C. §119, the contents of which are herein incorporated by reference in their entireties.

BACKGROUND

1. Field

Exemplary embodiments of the inventive concept relate to an I2C router system. More particularly, exemplary embodiments of the inventive concept relate to an I2C router system capable of improving a quality of a data communication using an I2C interface protocol.

2. Description of the Related Art

An I2C interface protocol is a data communication protocol for communicating between general-purpose circuits such as memory devices and LCD drivers.

An I2C bus is a bi-directional 2-wire bus or a bi-directional 3-wire bus. Devices which support the I2C bus embed the I2C bus interface and communicate with each other by the I2C interface protocol, via the I2C bus.

The I2C bus allows integrated circuits to communicate directly with each other via a simple bi-directional 2-wire bus. A device is connected to each of the two wires on the bus. One (SDA) of two wires is for the communication of data and the other (SCL) of two wires is for the control and synchronization of the communication of data between the devices.

Each device that is connected to the I2C bus is identifiable by a unique address, and may operate as either a transmitter or a receiver, or both. Data are transferred using a master-slave protocol. A master device initiates a data transfer and generates clock signals to permit the transfer. A slave device is addressed for this transfer.

The data transfer may be initiated by the master device to transmit data to the slave device (write) or to request data from the slave device (read). A particular device may be a master device, a slave device, or both (master/slave). For example, an output device such as a display panel is typically not able to initiate a data transfer, and therefore would be configured to only operate as the slave device.

An I2C bus may be connected to an external master device to control an initial value of the slave device or to debug a system.

When a plurality of master/slave devices are connected to a plurality of slave devices via one I2C bus, operation signals of master/slave devices may be sequentially transmitted to the slave devices via the one I2C bus. Thus, total communication time between the master/slave devices and the slave devices increases and connection load of the I2C bus increases. In addition, quality of data transfer decreases.

When the master/slave devices and the slave devices are connected via plural I2C buses to decrease the connection load of the I2C buses, wires of an inner system and wires between the system and the external master device increase.

SUMMARY

One or more exemplary embodiments of the inventive concept provide an I2C router system capable of improving a quality of a data communication.

According to an exemplary embodiment, an I2C router system includes an I2C router part, a first slave device and a second slave device. The I2C router part includes a first I2C router configured to output a first I2C signal via a first I2C bus, and a second I2C router configured to output a second I2C signal via a second I2C bus. The first slave device configured to receive the first I2C signal via the first I2C bus. The second slave device configured to receive the second I2C signal via the second I2C bus.

In an exemplary embodiment, the I2C router system may further include an external master device configured to output an external master I2C signal, which includes an external master data signal and an external master clock signal, to the I2C router part, and to toggle a router enable signal between a first status signal and a second status signal. The first I2C router may be further configured to output the first I2C signal comprising the external master I2C signal when the router enable signal is toggled to the second status signal, and the second I2C router may be further configured to output the second I2C signal comprising the external master I2C signal when the router enable signal is toggled to the second status signal.

In an exemplary embodiment, the I2C router part may further include a first switch and a second switch. The first switch may be configured to receive the external master I2C signal and to output the external master I2C signal to the first I2C router when the router enable signal is toggled to the second status signal. The second switch may be configured to receive the external master I2C signal and to output the external master I2C signal to the second I2C router when the router enable signal is toggled to the second status signal.

In an exemplary embodiment, the external master device may be connected to the I2C router part via one external I2C bus, and the first switch and the second switch may be connected to the one external I2C bus in parallel.

In an exemplary embodiment, the first slave device may have a first address. The second slave device may have a second address. When the router enable signal is toggled to the first status signal, the first address and the second address have the same value.

In an exemplary embodiment, when the router enable signal is toggled to the second status signal, the first address of the first slave device may be different from the second address of the second slave device.

In an exemplary embodiment, when the router enable signal is toggled to the second status signal, the first I2C router may output the first I2C signal and the second I2C router may subsequently output the second I2C signal, so that the first I2C signal and the second I2C signal are sequentially output.

In an exemplary embodiment, the I2C router system may further include a master-slave device. The I2C router part may further include a third I2C router electrically connected to the master-slave device via a third I2C bus, and electrically connected to the first and second I2C routers via a fourth I2C bus.

In an exemplary embodiment, the master-slave device may be configured to output an internal master I2C signal, which includes an internal master data signal and an internal master clock signal, to the third I2C router via the third I2C bus when the router enable signal is toggled to the first status signal. The third I2C router may be configured to output the internal master I2C signal to the first and second I2C routers via the fourth I2C bus when the router enable signal is toggled to the first status signal. The first I2C router may be configured to output the first I2C signal comprising the internal master I2C signal when the router enable signal is toggled to the first status signal. The second I2C router may be configured to output the second I2C signal comprising the internal master I2C signal when the router enable signal is toggled to the first status signal.

In an exemplary embodiment, when the router enable signal is toggled to the first status signal, the first and second I2C routers may be configured to respectively and simultaneously output the first I2C signal and the second I2C signal.

In an exemplary embodiment, when the router enable signal is toggled to the second status signal, the third I2C router may be configured to output a third I2C signal, which includes the external master I2C signal, via the third I2C bus.

In an exemplary embodiment, the I2C router part may further include a third switch configured to receive the external master I2C signal and to output the external master I2C signal to the third I2C router when the router enable signal is toggled to the second status signal.

In an exemplary embodiment, the master-slave device may be configured to operate as a master device when the router enable signal is toggled to the first status signal. The master-slave device may be configured to operate as a slave device when the router enable signal is toggled to the second status signal.

In an exemplary embodiment, the I2C router system may further include an internal master device. The I2C router part may further include a third I2C router electrically connected to the internal master device via a third I2C bus, and electrically connected to the first and second I2C routers via a fourth I2C bus.

In an exemplary embodiment, the internal master device may be configured to output an internal master I2C signal via the third I2C bus. The internal master I2C signal may include an internal master data signal and an internal master clock signal. The third I2C router may be configured to output the internal master I2C signal to the first and second I2C routers via the fourth I2C bus. The first I2C router may be configured to output the first I2C signal comprising the internal master I2C signal. The second I2C router may be configured to output the second I2C signal comprising the internal master I2C signal.

In an exemplary embodiment, the first and second I2C routers may be configured to respectively and simultaneously output the first I2C signal and the second I2C signal.

In an exemplary embodiment, the first I2C router and the second I2C router may be connected to the fourth I2C bus in parallel.

In an exemplary embodiment, the first slave device and the second slave device may include at least one of an electrically erasable programmable read-only memory (EEPROM), a power management integrated circuit (PMIC), a display panel and a display apparatus timing controller, respectively.

According to one or more exemplary embodiment of the I2C router system, total communication time between master devices, slave devices and master/slave devices may decrease and connection load of the I2C bus may decrease. In addition, quality of data transfer may increase.

BRIEF DESCRIPTION OF THE DRAWINGS

The above and other features and advantages of the inventive concept will become more apparent by describing in detailed exemplary embodiments thereof with reference to the accompanying drawings, in which.

DETAILED DESCRIPTION

Hereinafter, the inventive concept will be explained in detail with reference to the accompanying drawings.

Figure 1:
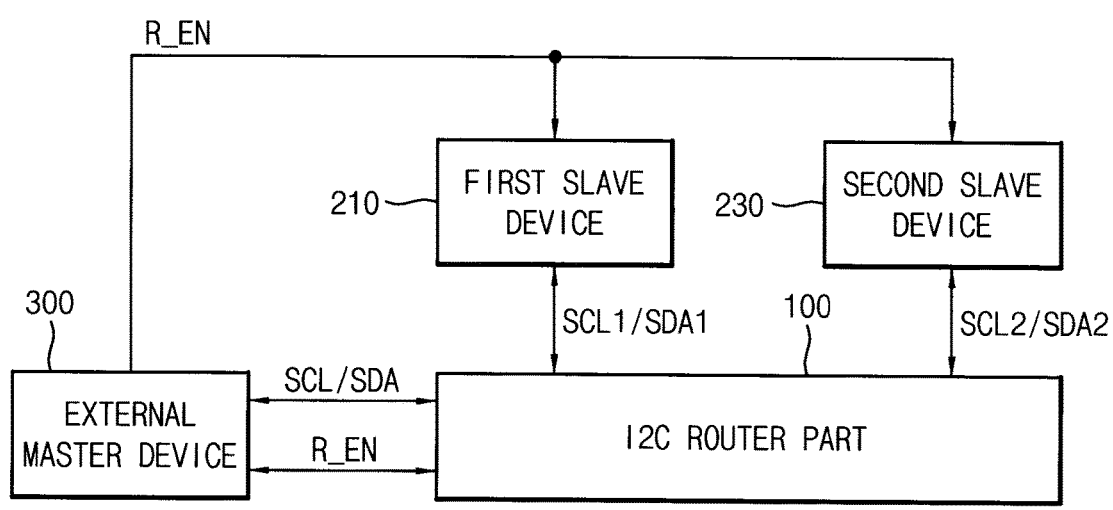
FIG. 1 is a block diagram illustrating an I2C router system according to an exemplary embodiment of the inventive concept.
Figure 2:
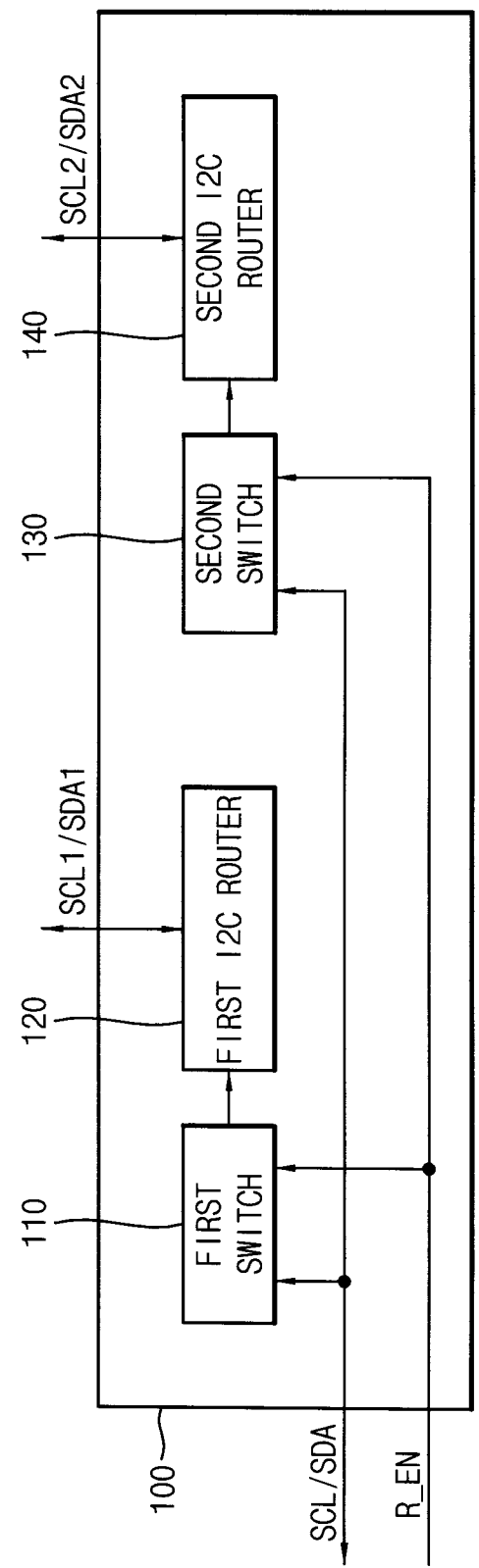
FIG. 2 is a block diagram illustrating further details of an I2C router part of FIG. 1.

FIG. 1 is a block diagram illustrating an I2C router system according to an exemplary embodiment of the inventive concept. FIG. 2 is a block diagram illustrating further details of an I2C router part of FIG. 1.

Referring to FIGS. 1 and 2, the I2C router system includes an I2C router part 100, a first slave device 210, a second slave device 230 and an external master device 300.

The I2C router part 100 may include a first switch 110, a first I2C router 120, a second switch 130 and a second I2C router 140.

The first I2C router 120 may be electrically connected to the first slave device 210 via a first I2C bus SCL1/SDA1. The first I2C bus SCL1/SDA1 may include two wires, one (SDA1) for the communication of data, and the other (SCL1) for the control and synchronization of the communication of data between devices. The first I2C router 120 may output a first I2C signal to the first slave device 210, via the first I2C bus SCL1/SDA1.

The second I2C router 140 may be electrically connected to the second slave device 230 via a second I2C bus SCL2/SDA2. The second I2C bus SCL2/SDA2 may include two wires, one (SDA2) for the communication of data, and the other (SCL2) for the control and synchronization of the communication of data between devices. The second I2C router 140 may output a second I2C signal to the second slave device 230, via the second I2C bus SCL2/SDA2.

The first slave device 210 may include a slave device of the master-slave protocol. The first slave device 210 may be electrically connected to the first I2C router 120 via the first I2C bus SCL1/SDA1. The first slave device 210 may receive data from the first I2C router 120. The first slave device 210 may have a first address. The first address may include 7-bit data. Alternatively, the first address may include 10-bit data.

The second slave device 230 may include a slave device of the master-slave protocol. The second slave device 230 may be electrically connected to the second I2C router 140 via the second I2C bus SCL2/SDA2. The second slave device 230 may receive data from the second I2C router 140. The second slave device 230 may have a second address. The second address may include 7-bit data. Alternatively, the second address may include 10-bit data.

The first slave device 210 and the second slave device 230 may include at least one of an electrically erasable programmable read-only memory (EEPROM), a power management integrated circuit (PMIC), a display panel and a timing controller of a display apparatus.

The external master device 300 may include a master device of the master-slave protocol. The external master device 300 may be electrically connected to the I2C router part 100. For example, the I2C router part 100 may include a connector configured to connect the I2C router part 100 to an external device using the I2C protocol. The external master device 300 may be electrically connected to the connector via an external I2C bus SCL/SDA. The external I2C bus SCL/SDA may include two wires, one (SDA) for the communication of data, and the other (SCL) for the control and synchronization of the communication of data between devices.

For example, the external master device 300 may be electrically and temporally connected to a display apparatus including the I2C router part 100, the first slave device 210 and the second slave device 230. The external master device 300 may thus debug, update and control initial values of the display apparatus.

The external master device 300 may output an external master I2C signal via the external I2C bus SCL/SDA. The external master I2C signal may include an external master data signal and an external master clock signal. The external master device 300 may toggle a router enable signal R_EN between a first status signal and a second status signal. The first status signal may correspond to a state before the external master device 300 is connected to the I2C router part 100, i.e. a state in which the device 300 is not connected to I2C router part 100. The second status signal may correspond to a state after the external master device 300 is connected to the I2C router part 100, i.e. a state in which the device 300 is connected to I2C router part 100. The router enable signal R_EN may be the first status signal when the external master device 300 is disconnected from the I2C router part 100. The router enable signal R_EN may be the second status signal when the external master device 300 is connected to the I2C router part 100.

The external master data signal may be transmitted via the data wire (SDA) of the external I2C bus SCL/SDA. The external master clock signal may be transmitted via the clock wire (SCL) of the external I2C bus SCL/SDA.

The external master device 300 may be electrically connected to the first switch 110 and the second switch 130 via the external I2C bus SCL/SDA. The external master device 300 may output the external master I2C signal to the first switch 110 and the second switch 130. For example, the first switch 110 and the second switch 130 may be electrically connected to the external I2C bus SCL/SDA in parallel.

The first switch 110 may receive the external master I2C signal and output the external master I2C signal to the first I2C router 120, when the router enable signal R_EN is the second status signal.

The second switch 130 may receive the external master I2C signal and output the external master I2C signal to the second I2C router 140, when the router enable signal R_EN is the second status signal.

The first I2C router 120 may output the first I2C signal, which includes the external master I2C signal, to the first slave device 210 via the first I2C bus SCL1/SDA1, when the router enable signal R_EN is the second status signal.

The first I2C router 120 is electrically connected to the first I2C bus SCL1/SDA1 and outputs the external master I2C signal, but the first I2C router 120 may include neither a slave device nor a master device of the master-slave protocol.

The second I2C router 140 may output the second I2C signal, which includes the external master I2C signal, to the second slave device 230 via the second I2C bus SCL2/SDA2, when the router enable signal R_EN is the second status signal.

The second I2C router 140 is electrically connected to the second I2C bus SCL2/SDA2 and outputs the external master I2C signal, but the second I2C router 140 may include neither a slave device nor a master device of the master-slave protocol.

In this manner, the external master device 300 may be sequentially connected to the first slave device 210 and the second slave device 230 via a single external I2C bus and the I2C router part 100. For example, when the router enable signal R_EN is set to the second status signal, the first I2C router 120 and the second I2C router 140 may sequentially output the external master I2C signal.

In this exemplary embodiment, two slave devices are connected to the I2C router part 100, but not limited thereto or thereby. For example, the I2C router part 100 may be electrically connected to more than three slave devices, and may include more than three switches and more than three I2C routers, which correspond to the respective slave devices. When the I2C router part 100 includes the more than three switches and the more than three I2C routers, the external master device 300 may be electrically connected to the slave devices via the external I2C bus SCL/SDA.

The first address of the first slave device 210 and the second address of the second slave device 230 may have the same value as each other. Alternatively, the first address of the first slave device 210 and the second address of the second slave device 230 may have different addresses. For example, when the external master device 300 is disconnected from the I2C router part 100, and the first slave device 210 and the second slave device 230 receive the same I2C signal, the first slave device 210 and the second slave device 230 may have the same address. Alternatively, when the external master device 300 is connected to the I2C router part 100, the first slave device 210 and the second slave device 230 may have different addresses to avoid duplication between addresses of the first slave device 210 and the second slave device 230.

Accordingly, when the router enable signal R_EN is set to the second status signal, the first slave device 210 and the second slave device 230 may change at least one of the first and second addresses so that the two addresses are different from each other. For example, the first slave device 210 may have two addresses, one for the first status signal, and the other for the second status signal. The second slave device 230 may have two addresses, one for the first status signal, and the other for the second status signal.

Figure 3:
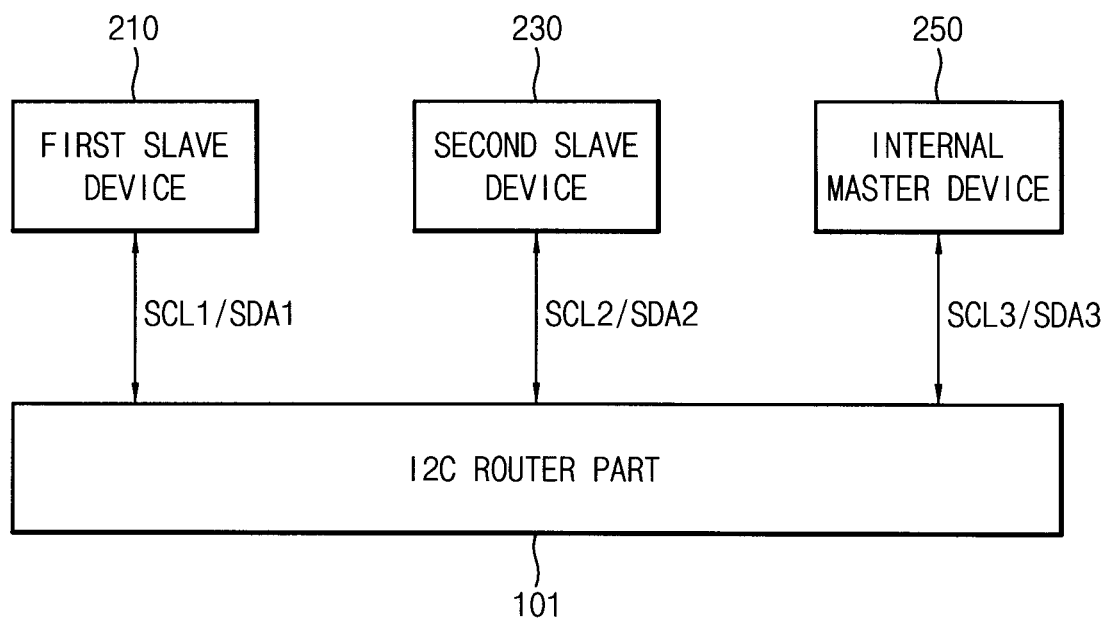
FIG. 3 is a block diagram illustrating an I2C router system according to an exemplary embodiment of the inventive concept.
Figure 4:
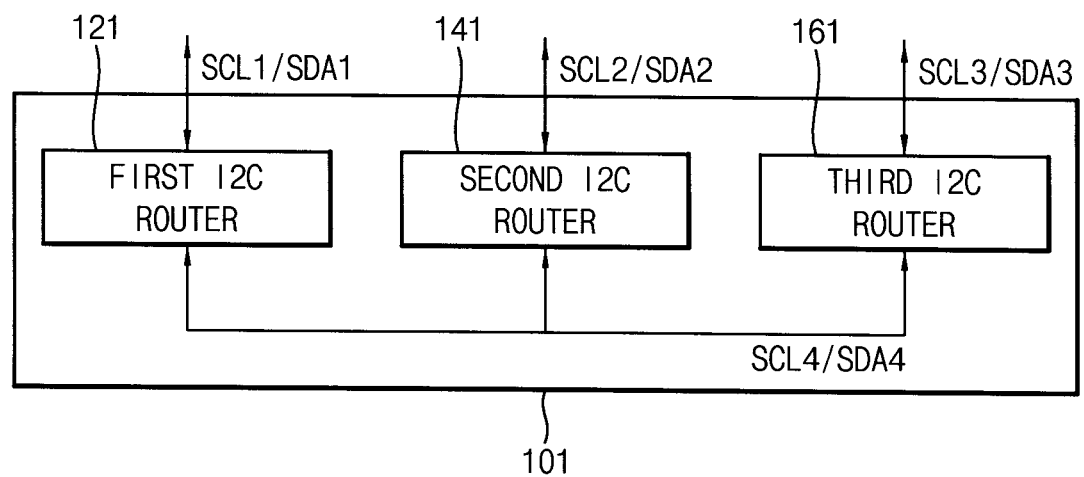
FIG. 4 is a block diagram illustrating an I2C router part in FIG. 3.

FIG. 3 is a block diagram illustrating an I2C router system according to an exemplary embodiment of the inventive concept. FIG. 4 is a block diagram illustrating an I2C router part in FIG. 3.

The I2C router system according to the illustrated exemplary embodiment is substantially the same as the display apparatus in FIGS. 1 and 2 except that an I2C router part 101 is different, an internal master device 250 is further included and the external master device is not included. Thus, the same reference numerals will be used to refer to same or like parts as those described in with reference to FIGS. 1 and 2 and any further repetitive explanation concerning the above elements will be omitted.

Referring to FIGS. 3 and 4, the I2C router system includes an I2C router part 101, a first slave device 210, a second slave device 230 and an internal master device 250.

The I2C router part 101 may include a first I2C router 121, a second I2C router 141 and a third I2C router 161.

The first I2C router 121 may be electrically connected to the first slave device 210 via a first I2C bus SCL1/SDA1. The first I2C router 121 may output a first I2C signal to the first slave device 210 via the first I2C bus SCL1/SDA1.

The second I2C router 141 may be electrically connected to the second slave device 230 via a second I2C bus SCL2/SDA2. The second I2C router 141 may output a second I2C signal to the second slave device 230 via the second I2C bus SCL2/SDA2.

The third I2C router 161 may be electrically connected to the internal master device 250 via a third I2C bus SCL3/SDA3. The third I2C bus SCL3/SDA3 may include two wires, one (SDA3) for the communication of data, and the other (SCL3) for the control and synchronization of the communication of data between devices.

The third I2C router 161 may be electrically connected to the first I2C router 121 and the second I2C router 141 via a fourth I2C bus SCL4/SDA4. For example, the first I2C router 121 and the second I2C router 141 may be electrically connected to the fourth I2C bus SCL4/SDA4 in parallel. The fourth I2C bus SCL4/SDA4 may include two wires, one (SDA4) for the communication of data, and the other (SCL4) for the control and synchronization of the communication of data between devices.

The first slave device 210 may include a slave device of the master-slave protocol. The first slave device 210 may be electrically connected to the first I2C router 121 via the first I2C bus SCL1/SDA1. The first slave device 210 may receive data from the first I2C router 121. The first slave device 210 may have a first address. The first address may include 7-bit data. Alternatively, the first address may include 10-bit data.

The second slave device 230 may include a slave device of the master-slave protocol. The second slave device 230 may be electrically connected to the second I2C router 141 via the second I2C bus SCL2/SDA2. The second slave device 230 may receive data from the second I2C router 141. The second slave device 230 may have a second address. The second address may include 7-bit data. Alternatively, the second address may include 10-bit data.

The internal master device 250 may include a master device of the master-slave protocol. The internal master device 250 may be electrically connected to the third I2C router 161 via the third I2C bus SCL3/SDA3. The internal master device 250 may output an internal master I2C signal via the third I2C bus SCL3/SDA3. The internal master I2C signal may include an internal master data signal and an internal master clock signal.

The internal master data signal may be transmitted via the data wire (SDA3) of the third I2C bus SCL3/SDA3. The internal master clock signal may be transmitted via the clock wire (SCL3) of the third I2C bus SCL3/SDA3.

The third I2C router 161 may receive the internal master I2C signal from the internal master device 250, and output the internal master I2C signal to the first I2C router 121 and the second I2C router 141, simultaneously. The third I2C router 161 may output the internal master I2C signal to the first I2C router 121 and the second I2C router 141 via the fourth I2C bus SCL4/SDA4.

The first I2C router 121 may output the first I2C signal, which includes the internal master I2C signal, to the first slave device 210 via the first I2C bus SCL1/SDA1. The second I2C router 141 may output the second I2C signal, which also includes the internal master I2C signal, to the second slave device 230 via the second I2C bus SCL2/SDA2.

The first I2C router 121 is electrically connected to the first I2C bus SCL1/SDA1 and the fourth I2C bus SCL4/SDA4, and outputs the internal master I2C signal, but the first I2C router 121 may include neither a slave device nor a master device of the master-slave protocol.

The second I2C router 141 is electrically connected to the second I2C bus SCL2/SDA2 and the fourth I2C bus SCL4/SDA4, and outputs the internal master I2C signal, but the second I2C router 141 may include neither a slave device nor a master device of the master-slave protocol.

Thus, the third I2C router 161 may transmit the internal master I2C signal to the first I2C router 121 and the second I2C router 141, simultaneously.

In addition, the first address of the first slave device 210 and the second address of the second slave device 230 may each have the same value. Thus, a timing of the first I2C router 121 outputting the internal master I2C signal via the first I2C bus SCL1/SDA1 may be equal to a timing of the second I2C router 141 outputting the internal master I2C signal via the second I2C bus SCL2/SDA2.

As a result, the internal master device 250 may simultaneously transmit a same data to the first slave device 210 and the second slave device 230, which each have the same address.

In this exemplary embodiment, two slave devices are connected to the I2C router part 101, but the embodiment is not limited thereto or thereby. The I2C router part 101 may be electrically connected to more than three slave devices, and may include more than three I2C routers which correspond to the respective slave devices. When the I2C router part 101 includes the more than three I2C routers, the internal master device 250 may simultaneously transmit a same data to each of the more than three slave devices.

Figure 5:
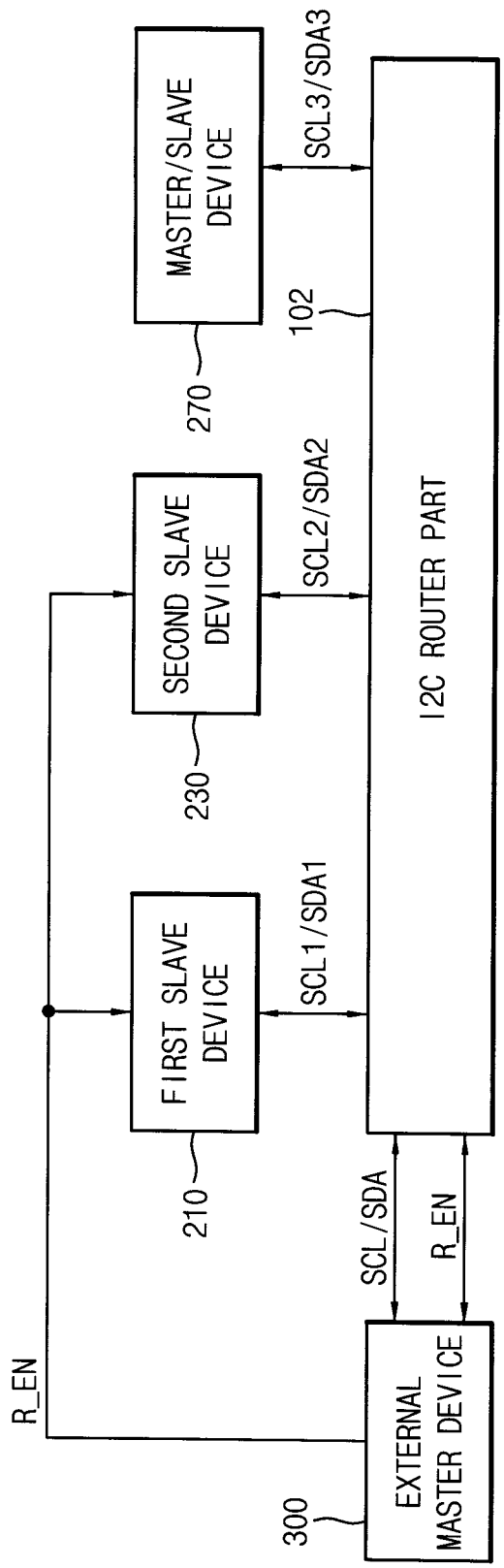
FIG. 5 is a block diagram illustrating an I2C router system according to an exemplary embodiment of the inventive concept.
Figure 6:
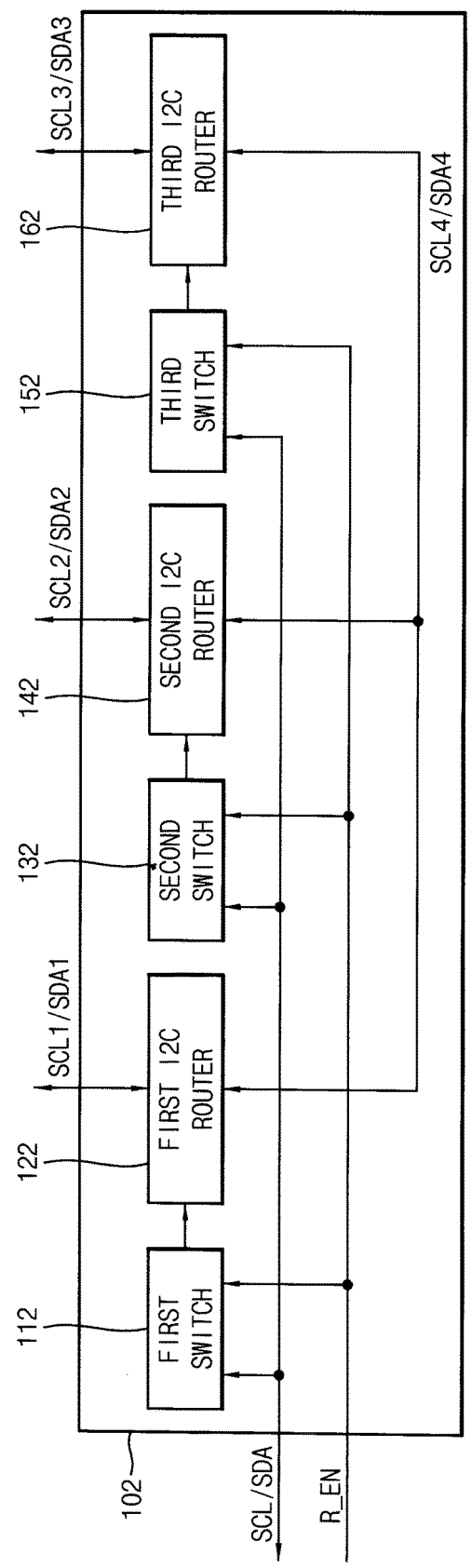
FIG. 6 is a block diagram illustrating an I2C router part in FIG. 5.

FIG. 5 is a block diagram illustrating an I2C router system according to another exemplary embodiment of the inventive concept. FIG. 6 is a block diagram illustrating an I2C router part in FIG. 5.

The I2C router system according to the illustrated exemplary embodiment is substantially the same as the display apparatus in FIGS. 1 and 2, except that an I2C router part 101 is different and a master/slave device 270 is further included. Thus, the same reference numerals will be used to refer to same or like parts as those described with reference to FIGS. 1 and 2, and any further repetitive explanation concerning the above elements will be omitted.

Referring to FIGS. 5 and 6, the I2C router system includes an I2C router part 102, a first slave device 210, a second slave device 230, an external master device 300 and a master/slave device 270.

The I2C router part 102 may include a first switch 112, a first I2C router 122, a second switch 132, a second I2C router 142, a third switch 152 and a third I2C router 162.

The first I2C router 122 may be electrically connected to the first slave device 210 via a first I2C bus SCL1/SDA1. The first I2C router 122 may output a first I2C signal to the first slave device 210 via the first I2C bus SCL1/SDA1.

The second I2C router 142 may be electrically connected to the second slave device 230 via a second I2C bus SCL2/SDA2. The second I2C router 142 may output a second I2C signal to the second slave device 230 via the second I2C bus SCL2/SDA2.

The third I2C router 162 may be electrically connected to the master/slave device 270 via a third I2C bus SCL3/SDA3. The third I2C router 162 may output a third I2C signal to the master/slave device 270 via the third I2C bus SCL3/SDA3. The third I2C bus SCL3/SDA3 may include two wires, one (SDA3) for the communication of data, and the other (SCL3) for the control and synchronization of the communication of data between devices.

The third I2C router 162 may be electrically connected to the first I2C router 122 and the second I2C router 142 via a fourth I2C bus SCL4/SDA4. For example, the first I2C router 122 and the second I2C router 142 may be electrically connected to the fourth I2C bus in parallel. The fourth I2C bus SCL4/SDA4 may include two wires, one (SDA4) for the communication of data, and the other (SCL4) for the control and synchronization of the communication of data between devices.

The external master device 300 may be electrically connected to the first switch 112, the second switch 132 and the third switch 152 via an external I2C bus SCL/SDA. For example, the first switch 112, the second switch 132 and the third switch 152 may be electrically connected to the external I2C bus SCL/SDA in parallel. The external I2C bus SCL/SDA may include two wires, one (SDA) for the communication of data, and the other (SCL) for the control and synchronization of the communication of data between devices.

The first slave device 210 may receive data from the first I2C router 122. The first slave device 212 may have a first address. The first address may include 7-bit data. Alternatively, the first address may include 10-bit data.

The second slave device 230 may receive data from the second I2C router 142. The second slave device 230 may have a second address. The second address may include 7-bit data. Alternatively, the second address may include 10-bit data.

The master/slave device 270 may include a master device and a slave device of the master-slave protocol. For example, the master/slave device may operate as both a master device and a slave device.

When the master/slave device 270 operates as a master device, the master/slave device 270 may output an internal master I2C signal, which includes an internal master data signal and an internal master clock signal, via the third I2C bus SCL3/SDA3. The internal master data signal may be transmitted via the data wire (SDA3) of the third I2C bus SCL3/SDA3. The internal master clock signal may be transmitted via the clock wire (SCL3) of the third I2C bus SCL3/SDA3.

When the master/slave device 270 operates as a slave device, the master/slave device 270 may receive I2C signals from the third I2C router 162.

The external master device 300 may include a master device of the master-slave protocol. The external master device 300 may be electrically and temporally connected to a display apparatus which includes the I2C router system. The external master device 300 may, for example, debug, update and control initial values of the display apparatus.

The external master device 300 may output an external master I2C signal via the external I2C bus SCL/SDA. The external master I2C signal may include an external master data signal and an external master clock signal. The external master device 300 may toggle a router enable signal R_EN between a first status signal and a second status signal. The first status signal may correspond to a state before the external master device 300 is connected to the I2C router part 102, i.e. no external master device is connected. The second status signal may correspond to a state after the external master device 300 is connected to the I2C router part 102, i.e. an external master device is connected. The router enable signal R_EN may be set to the first status signal when the external master device 300 is disconnected from the I2C router part 102. The router enable signal R_EN may be set to the second status signal when the external master device 300 is connected to the I2C router part 102.

The external master data signal may be transmitted via the data wire (SDA) of the external I2C bus SCL/SDA. The external master clock signal may be transmitted via the clock wire (SCL) of the external I2C bus SCL/SDA.

Hereinafter, the inventive concept will be explained based on the first status signal.

When the router enable signal R_EN is set to the first status signal, the first switch 112, the second switch 132 and the third switch 152 do not transmit the external master I2C signal to the first I2C router 122, the second I2C router 142 and the third I2C router 162, respectively.

The master/slave device 270 may therefore operate as a master device of the master-slave protocol. Thus, the master/slave device 270 may output the internal master I2C signal via the third I2C bus SCL3/SDA3.

The third I2C router 162 may receive the internal master I2C signal, and output the internal master I2C signal to the first I2C router 122 and the second I2C router 144 via the fourth I2C bus SCL4/SDA4, simultaneously.

The first I2C router 122 may output the first I2C signal, which includes the internal master I2C signal, to the first slave device 210 via the first I2C bus SCL1/SDA1. The second I2C router 142 may output the second I2C signal, which includes the internal master I2C signal, to the second slave device 230 via the second I2C bus SCL2/SDA2.

The first I2C router 122 is electrically connected to the first I2C bus SCL1/SDA1 and the fourth I2C bus SCL4/SDA4, and outputs the internal master I2C signal, but the first I2C router 122 may include neither a slave device nor a master device of the master-slave protocol.

The second I2C router 142 is electrically connected to the second I2C bus SCL2/SDA2 and the fourth I2C bus SCL4/SDA4, and outputs the internal master I2C signal, but the second I2C router 142 may include neither a slave device nor a master device of the master-slave protocol.

Thus, the third I2C router 162 may transmit the internal master I2C signal to the first I2C router 122 and the second I2C router 142, simultaneously.

In addition, the first address of the first slave device 210 and the second address of the second slave device 230 may have the same value as each other. Accordingly, the timing of the first I2C router 122 in outputting the internal master I2C signal via the first I2C bus SCL1/SDA1 may be the same as that of the second I2C router 142 in outputting the internal master I2C signal via the second I2C bus SCL2/SDA2.

As a result, the master/slave device 270 may simultaneously transmit a same data to the first slave device 210 and the second slave device 230, which have the same address as each other.

Next, the inventive concept will be explained based on the second status signal.

When the router enable signal R_EN is the second status signal, i.e. external master device 300 is present and connected, the master/slave device 270 operates as a slave device of the master-slave protocol. Thus, the master/slave device 270 may not output the internal master I2C signal via the third I2C bus SCL3/SDA3.

When the router enable signal R_EN is set to the second status signal, the first switch 112, the second switch 132 and the third switch 152 may transmit the external master I2C signal to the first I2C router 122, the second I2C router 142 and the third I2C router 162, respectively.

The first I2C router 122 may output the first I2C signal, which includes the external master I2C signal, to the first slave device 210 via the first I2C bus SCL1/SDA1.

The second I2C router 142 may output the second I2C signal, which includes the external master I2C signal, to the second slave device 230 via the second I2C bus SCL2/SDA2.

The third I2C router 162 may output the third I2C signal, which includes the external master I2C signal, to the master/slave device 270 via the third I2C bus SCL3/SDA3.

The external master device 300 may transmit data to the first slave device 210 and the second slave device 230, independently. For transmitting independent data to the first slave device 210 and the second slave device 230, the first address of the first slave device 210 and the second address of the second slave device 230 may be different.

Accordingly, when the router enable signal R_EN is the second status signal, the first slave device 210 and the second slave device 230 may each set their two addresses to values that are different from each other. For example, the first slave device 210 may have two addresses, one for the first status signal and the other for the second status signal. The second slave device 230 may also have two addresses, one for the first status signal and the other for the second status signal.

As a result, the external master device 300 may be sequentially connected to the to the first slave device 210, the second slave device 230 and the master/slave device 270 via a single external I2C bus SCL/SDA and the I2C router part 102. For example, when the router enable signal R_EN is set to the second status signal, the first I2C router 122, the second I2C router 142 and the third I2C router 162 may sequentially output the external master I2C signal.

In this exemplary embodiment, two slave devices are connected to the I2C router part 102, but the embodiments are not limited thereto or thereby. The I2C router part 102 may be electrically connected to more than three slave devices, and may include more than three switches and more than three I2C routers, which correspond to the respective slave devices. When the I2C router part 102 includes the more than three switches and the more than three I2C routers, the external master device 300 may be electrically connected to each of the slave devices via the external I2C bus SCL/SDA.

According to one or more of the illustrated exemplary embodiments, an external master device may be connected to the I2C router part via a single I2C bus, and a plurality of slave devices may be connected to the I2C router part in parallel, via independent I2C buses. Thus, total communication time between the master devices and the slave devices may decrease and connection load of I2C buses may decrease. In addition, quality of data transfer may be improved.

An I2C router system of the illustrated exemplary embodiments may be applied to fixed type displays such as television and desktop displays, mobile type displays such as those for a mobile phone, a notebook computer and a tablet computer, and various other systems which use an I2C interface protocol.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. Also, the various features of the embodiments shown can be mixed and matched in any manner, so as to produce further embodiments also contemplated by the invention. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. An I2C router system comprising:
    an I2C router part comprising a first I2C router configured to output a first I2C signal via a first I2C bus, and a second I2C router configured to output a second I2C signal via a second I2C bus;
    a first slave device configured to receive the first I2C signal via the first I2C bus;
    a second slave device configured to receive the second I2C signal via the second I2C bus;
    a first switch in electronic communication with the first I2C router, the first switch configured to receive a router enable signal and an external master I2C signal from an external master device, and to output the external master I2C signal to the first I2C router in response to the router enable signal; and
    a second switch in electronic communication with the second I2C router, the second switch configured to receive the router enable signal and the external master I2C signal from the external master device, and to output the external master I2C signal to the second I2C router in response to the router enable signal.

2. The I2C router system of claim 1, wherein the external master device is configured to output the external master I2C signal, which comprises an external master data signal and an external master clock signal, to the I2C router part, and to toggle the router enable signal between a first status signal and a second status signal,
    wherein the first I2C router is further configured to output the first I2C signal comprising the external master I2C signal when the router enable signal is toggled to the second status signal, and
    wherein the second I2C router is further configured to output the second I2C signal comprising the external master I2C signal when the router enable signal is toggled to the second status signal.

3. The I2C router system of claim 2,
    wherein the first switch is configured to output the external master I2C signal to the first I2C router when the router enable signal is toggled to the second status signal, and
    wherein the second switch is configured to output the external master I2C signal to the second I2C router when the router enable signal is toggled to the second status signal.

4. The I2C router system of claim 3, wherein the external master device is connected to the I2C router part via one external I2C bus, and
    the first switch and the second switch are connected to the one external I2C bus in parallel.

5. The I2C router system of claim 2, wherein the first slave device has a first address,
    the second slave device has a second address, and when the router enable signal is toggled to the first status signal, the first address and the second address have the same value.

6. The I2C router system of claim 5, wherein when the router enable signal is toggled to the second status signal, the first address of the first slave device is different from the second address of the second slave device.

7. The I2C router system of claim 2, wherein when the router enable signal is toggled to the second status signal, the first I2C router outputs the first I2C signal and the second I2C router subsequently outputs the second I2C signal, so that the first I2C signal and the second I2C signal are sequentially output.

8. The I2C router system of claim 2, further comprising a master-slave device,
wherein the I2C router part further comprises a third I2C router electrically connected to the master-slave device via a third I2C bus, and electrically connected to the first and second I2C routers via a fourth I2C bus.

9. The I2C router system of claim 8, wherein the master-slave device is configured to output an internal master I2C signal, which comprises an internal master data signal and an internal master clock signal, to the third I2C router via the third I2C bus when the router enable signal is toggled to the first status signal,
the third I2C router is configured to output the internal master I2C signal to the first and second I2C routers via the fourth I2C bus when the router enable signal is toggled to the first status signal,
the first I2C router is configured to output the first I2C signal comprising the internal master I2C signal when the router enable signal is toggled to the first status signal, and
the second I2C router is configured to output the second I2C signal comprising the internal master I2C signal when the router enable signal is toggled to the first status signal.

10. The I2C router system of claim 9, wherein when the router enable signal is toggled to the first status signal, the first and second I2C routers are configured to respectively and simultaneously output the first I2C signal and the second I2C signal.

11. The I2C router system of claim 8, wherein when the router enable signal is toggled to the second status signal, the third I2C router is configured to output a third I2C signal, which comprises the external master I2C signal, via the third I2C bus.

12. The I2C router system of claim 11, wherein the I2C router part further comprises a third switch configured to receive the external master I2C signal and to output the external master I2C signal to the third I2C router when the router enable signal is toggled to the second status signal.

13. The I2C router system of claim 8, wherein the master-slave device is configured to operate as a master device when the router enable signal is toggled to the first status signal, and
the master-slave device is configured to operate as a slave device when the router enable signal is toggled to the second status signal.

14. The I2C router system of claim 1, further comprising an internal master device,
wherein the I2C router part further comprises a third I2C router electrically connected to the internal master device via a third I2C bus, and electrically connected to the first and second I2C routers via a fourth I2C bus.

15. The I2C router system of claim 14, wherein the internal master device is configured to output an internal master I2C signal via the third I2C bus, the internal master I2C signal comprising an internal master data signal and an internal master clock signal,
the third I2C router is configured to output the internal master I2C signal to the first and second I2C routers via the fourth I2C bus,
the first I2C router is configured to output the first I2C signal comprising the internal master I2C signal, and
the second I2C router is configured to output the second I2C signal comprising the internal master I2C signal.

16. The I2C router system of claim 15, wherein the first and second I2C routers are configured to respectively and simultaneously output the first I2C signal and the second I2C signal.

17. The I2C router system of claim 14, wherein the first I2C router and the second I2C router are connected to the fourth I2C bus in parallel.

18. The I2C router system of claim 1, wherein the first slave device and the second slave device comprise at least one of an electrically erasable programmable read-only memory (EEPROM), a power management integrated circuit (PMIC), a display panel and a display apparatus timing controller.

* * * * *